US012659416B2

(12) United States Patent
Tamura

(10) Patent No.: US 12,659,416 B2
(45) Date of Patent: Jun. 16, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Shigeru Tamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/189,237

(22) Filed: Mar. 24, 2023

(65) Prior Publication Data

US 2024/0073341 A1     Feb. 29, 2024

(30) Foreign Application Priority Data

Aug. 31, 2022     (JP) ................................. 2022-138076

(51) Int. Cl.
*H04N 1/195*          (2006.01)
*H04N 1/047*          (2006.01)

(52) U.S. Cl.
CPC ......... *H04N 1/19594* (2013.01); *H04N 1/047* (2013.01); *H04N 2201/0436* (2013.01)

(58) Field of Classification Search
CPC .............. H04N 1/19594; H04N 1/047; H04N 2201/0436; H04N 1/0044; H04N 1/00702; H04N 1/00251; H04N 1/00785; H04N 1/00798; H04N 1/028
USPC .......................................... 382/176; 358/474
See application file for complete search history.

(56) References Cited

U.S. PATENT DOCUMENTS

| | | | | |
|---|---|---|---|---|
| 2006/0114484 | A1* | 6/2006 | Kitora ................ | G06V 30/1448 |
| | | | | 358/1.13 |
| 2018/0160001 | A1 | 6/2018 | Misu | |
| 2020/0047513 | A1 | 2/2020 | Arakane et al. | |
| 2022/0327850 | A1* | 10/2022 | Miyauchi ........... | H04N 1/00424 |

FOREIGN PATENT DOCUMENTS

| | | |
|---|---|---|
| JP | 2010021830 | 1/2010 |
| JP | 4735649 | 7/2011 |

OTHER PUBLICATIONS

"Search Report of Europe Counterpart Application", issued on Jan. 18, 2024, p. 1-p. 8.
"Office Action of Europe Counterpart Application", issued on Feb. 20, 2025, pp. 1-7.

* cited by examiner

*Primary Examiner* — Charlotte M Baker
(74) *Attorney, Agent, or Firm* — JCIPRNET

(57)          ABSTRACT
An information processing apparatus includes a processor configured to execute processing using an image of a document, on the document, the processing corresponding to an installation position of the document in an installation area where the document is installed.

18 Claims, 7 Drawing Sheets

10

IMAGE FORMING APPARATUS

| 11 — CPU | 16 — R/W | 17 |
| 12 — MEMORY | | |
| 14 — INPUT UNIT | | |
| 15 — DISPLAY UNIT | | |
| 70 — DOCUMENT CAMERA | | |

40

13 — STORAGE UNIT

13A — INFORMATION PROCESSING PROGRAM

13B — PROCESSING-RELATED INFORMATION DATABASE

18 — COMMUNICATION I/F UNIT

B

PROCESSING-RELATED INFORMATION DATABASE

| PROCESSING TYPE | DOCUMENT POSITION | PROCESSING CONTENT |
|---|---|---|
| IMAGE PRINTING | LEFT END SIDE | COLOR PRINTING |
|  | RIGHT END SIDE | MONOCHROME PRINTING |

PROCESSING-RELATED INFORMATION DATABASE

| PROCESSING TYPE | DOCUMENT POSITION | PROCESSING CONTENT |
|---|---|---|
| IMAGE PRINTING | LEFT END SIDE | COLOR PRINTING |
| | RIGHT END SIDE | MONOCHROME PRINTING |
| IMAGE READING | UPPER END SIDE | COLOR READING |
| | LOWER END SIDE | MONOCHROME READING |

LIVE-VIEW IMAGE

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-138076 filed Aug. 31, 2022.

BACKGROUND

(i) Technical Field

The present disclosure relates to an information processing apparatus, a non-transitory computer readable medium storing an information processing program, and an information processing method.

(ii) Related Art

In the related art, there has been the following technique as a technique, in performing processing using a document, that can be applied in order to reduce a time requested for performing the processing.

JP4735649B proposes a captured image projection apparatus that aims to reduce a processing time until an image acquired by imaging is projected.

The captured image projection apparatus comprises, in a captured image projection apparatus that projects an image of an imaged subject onto a screen, a camera that images the subject and outputs image data of the imaged subject and an image processing unit that performs image processing on the image data output by the camera. Further, the captured image projection apparatus comprises a projection unit that projects an image based on the image data subjected to the image processing by the image processing unit on the screen and a control unit that controls the camera, the image processing unit, and the projection unit such that a frame frequency of an image captured by the camera is switched between at least two frequencies.

SUMMARY

However, in the technique, there is a problem that various settings need to be manually performed before the processing is executed and thus labor for the setting is requested.

Aspects of non-limiting embodiments of the present disclosure relate to an information processing apparatus, a non-transitory computer readable medium storing an information processing program, and an information processing method capable of executing processing while reducing labor for a setting, as compared with a case where the setting is manually performed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to execute processing using an image of a document, on the document, the processing corresponding to an installation position of the document in an installation area where the document is installed.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present disclosure will be described in detail with reference to drawings. In the present exemplary embodiment, an example of a form in a case where an information processing apparatus of the technique of the present disclosure is applied to an image forming apparatus provided in an office and having a document camera as a target will be described. However, the application target of the technique of the present disclosure is not limited to an office. Any place where the image forming apparatus can be installed, such as a store, a school, or a home, can be the application target thereof. The application target of the technique of the present disclosure is not limited to the image forming apparatus, and any apparatus that images a document using a camera and performs some pieces of processing can be the application target thereof, for example, a computer such as a desktop type personal computer, a notebook type personal computer, or a tablet type computer or an information terminal such as a mobile phone.

Figures 1, 2:
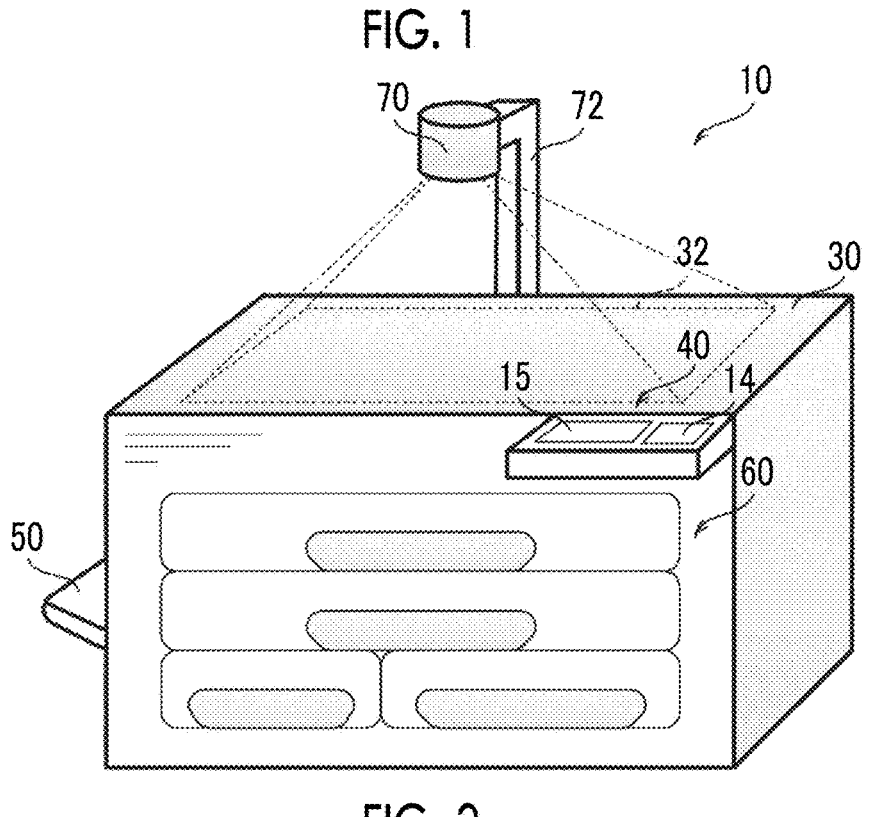
FIG. 1 is a perspective view of an example of an overall configuration of an image forming apparatus according to an exemplary embodiment.
FIG. 2 is a block diagram showing an example of a hardware configuration of an electric system of the image forming apparatus according to the exemplary embodiment.

First, a configuration of an image forming apparatus 10 according to the present exemplary embodiment will be described with reference to FIG. 1. FIG. 1 is a perspective view of an example of an overall configuration of the image forming apparatus 10 according to the present exemplary embodiment.

As shown in FIG. 1, the image forming apparatus 10 according to the present exemplary embodiment comprises a document table 30 on which a document is placed on an upper surface, a user interface unit (hereinafter, referred to as "UI unit") 40 that performs display of various types of information and an input of various types of information, a tray 50 for discharging paper on which an image is formed, and a paper feeding unit 60 that feeds various types of paper.

The image forming apparatus 10 according to the present exemplary embodiment is provided with a document camera 70 configured such that an upper surface side of the document table 30 can be imaged. The document camera 70 according to the present exemplary embodiment is provided at the other end portion of an arm 72 whose one end portion of which is fixed to a back side of the document table 30, and is positioned such that an imaging angle of view of the document camera 70 substantially matches a document disposition area 32 in the document table 30.

In the present exemplary embodiment, a camera that captures a color moving image is applied as the document camera 70, but the present disclosure is not limited thereto. For example, a camera that captures a monochrome or gray scale moving image may be applied as the document camera 70.

On the other hand, the UI unit 40 according to the present exemplary embodiment comprises an input unit 14 having various switches and a display unit 15 configured by a liquid crystal display or the like. The display unit 15 according to the present exemplary embodiment is configured as a so-called touch panel display in which a touch panel having light transmittance is provided on a surface side of a display.

In the present exemplary embodiment, a digital multi-function device having an image printing function, an image reading function, an image transmission function, and the like is applied as the image forming apparatus 10. However, the present disclosure is not limited to the form. A form may be employed in which another image forming apparatus such as an image forming apparatus having only the image printing function and an image forming apparatus having only the image printing function and the image reading function is applied as the image forming apparatus 10.

Next, a configuration of an electric system of the image forming apparatus 10 according to the present exemplary embodiment will be described with reference to FIG. 2. FIG. 2 is a block diagram showing an example of a hardware configuration of the electric system of the image forming apparatus 10 according to the present exemplary embodiment.

As shown in FIG. 2, the image forming apparatus 10 according to the present exemplary embodiment comprises a central processing unit (CPU) 11 as a processor, a memory 12 as a temporary storage area, a non-volatile storage unit 13, and the UI unit 40 including the input unit 14 and the display unit 15 described above. Further, the image forming apparatus 10 according to the present exemplary embodiment comprises a medium reading and writing apparatus (R/W) 16, a communication interface (I/F) unit 18, and the above document camera 70. The CPU 11, the memory 12, the storage unit 13, the UI unit 40, the medium reading and writing apparatus 16, the communication I/F unit 18, and the document camera 70 are connected to each other via a bus B. The medium reading and writing apparatus 16 reads out information written on a recording medium 17 and writes information on the recording medium 17.

The storage unit 13 according to the present exemplary embodiment is realized by a hard disk drive (HDD), a solid state drive (SSD), a flash memory, or the like. An information processing program 13A is stored in the storage unit 13 as a storage medium. The recording medium 17 on which the information processing program 13A is written is connected to the medium reading and writing apparatus 16, and the medium reading and writing apparatus 16 reads out the information processing program 13A from the recording medium 17 to store (install) the information processing program 13A in the storage unit 13. The CPU 11 reads out the information processing program 13A from the storage unit 13, expands the information processing program 13A into the memory 12, and sequentially executes processes included in the information processing program 13A.

A processing-related information database 13B is stored in the storage unit 13. Details of the processing-related information database 13B will be described below.

Needless to say, the image forming apparatus 10 is provided with apparatuses related to image processing such as an image forming engine and an image reading apparatus, although not illustrated.

Figures 3, 4:
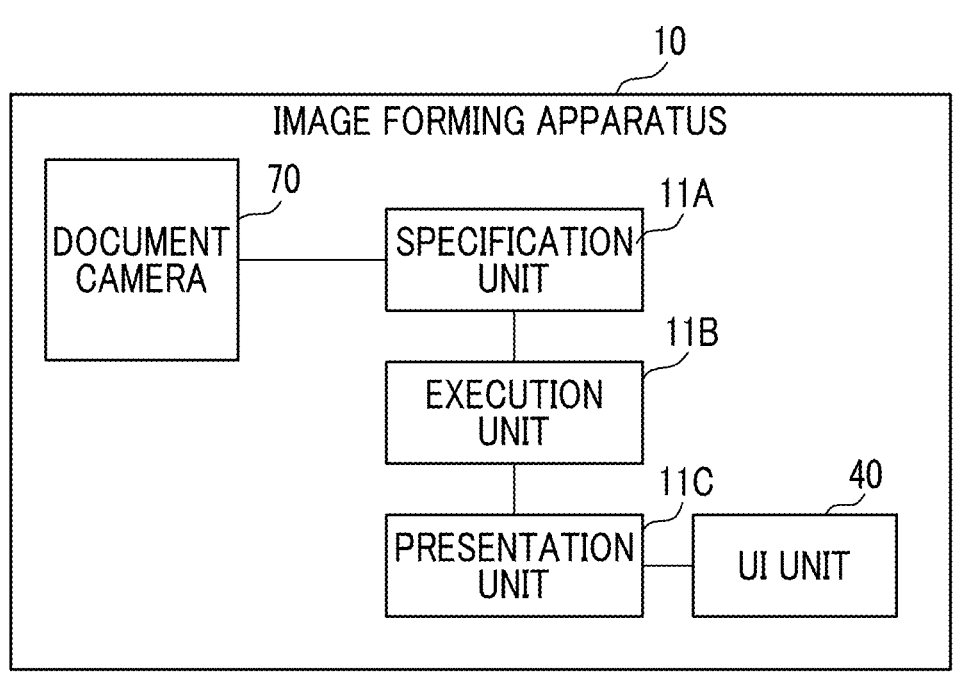
FIG. 3 is a block diagram showing an example of a functional configuration of the image forming apparatus according to the exemplary embodiment.
FIG. 4 is a schematic diagram showing an example of a configuration of a processing-related information database according to the exemplary embodiment.

Next, a functional configuration of the image forming apparatus 10 according to the present exemplary embodiment will be described with reference to FIG. 3. FIG. 3 is a block diagram showing an example of the functional configuration of the image forming apparatus 10 according to the present exemplary embodiment.

As shown in FIG. 3, the image forming apparatus 10 according to the present exemplary embodiment includes a specification unit 11A, an execution unit 11B, and a presentation unit 11C. The CPU 11 of the image forming apparatus 10 executes the information processing program 13A to function as the specification unit 11A, the execution unit 11B, and the presentation unit 11C.

The specification unit 11A according to the present exemplary embodiment uses an image obtained by imaging an installation area (the document disposition area 32 in the present exemplary embodiment) with a document camera 70 to specify an installation position of the document. In the present exemplary embodiment, the installation position of the document is specified by detecting a boundary position between a color of a surface on which the document is placed in the document disposition area 32 of the document table 30 and another color. However, the present disclosure is not limited thereto. For example, a form may be employed in which each piece of information on an external dimension and an external shape of the document is registered in advance and the installation position of the document is specified by known pattern matching in the related art that uses the registered information.

On the other hand, the execution unit 11B according to the present exemplary embodiment executes, in an installation area where a document is installed, processing using an image of the document, on the document, the processing corresponding to the installation position of the document. In the present exemplary embodiment, as the processing corresponding to the installation position of the document, image printing processing in color is applied in a case where the document is installed on a left end side of the document disposition area 32. On the contrary, in the present exemplary embodiment, as the processing corresponding to the installation position of the document, image printing processing in monochrome is applied in a case where the document is installed on a right end side of the document disposition area 32. As described above, in the present exemplary embodiment, in order to avoid complications, only two places are applied as the installation positions of the document, and only the image printing processing in color or monochrome is applied as processing corresponding to each of the two places. However, the present disclosure is not limited thereto. For example, processing by various settings, which is executable in the image forming apparatus 10, may be applied, such as reading processing or printing processing of different images in various modes, such as color, monochrome, and gray scale, and reading processing or printing processing of images with different densities, brightness, resolutions, and the like.

The presentation unit 11C according to the present exemplary embodiment presents a content of processing for each installation position of the document in the installation area. In the presentation unit 11C according to the present exemplary embodiment, the presentation is performed before the document is installed in the installation area. However, the present disclosure is not limited thereto. For example, a form may be employed in which the presentation is performed while the document is being installed in the installation area or after the document is installed.

In a case where the document is installed in the installation area, the presentation unit 11C according to the present exemplary embodiment presents a content of the processing corresponding to the installation position. In the presentation unit 11C according to the present exemplary embodiment, the content of the processing is presented together with the image of the document. However, the present disclosure is not limited thereto. For example, a form may be employed in which only the content of the processing is presented without presenting the image of the document.

In the present exemplary embodiment, as the presentation of various types of information by the presentation unit 11C, the presentation with the display by the display unit 15 in the UI unit 40 is applied. However, the present disclosure is not limited thereto. For example, a form may be employed in which the presentation with printing by an image forming unit or the presentation with voice by a voice reproduction apparatus is applied as the presentation of various types of information by the presentation unit 11C.

Next, the processing-related information database 13B according to the present exemplary embodiment will be described with reference to FIG. 4. FIG. 4 is a schematic diagram showing an example of a configuration of the processing-related information database 13B according to the present exemplary embodiment.

The processing-related information database 13B according to the present exemplary embodiment is a database showing a relationship between an installation position of the above document and the content of the processing corresponding to the installation position. As shown in FIG. 4 as an example, the processing-related information database 13B according to the present exemplary embodiment stores each piece of information on processing type, document position, and processing content in association with each other.

The processing type is information indicating a type of processing to which the image forming apparatus 10 according to the present exemplary embodiment corresponds, and the document position is information indicating the installation position of the document described above. Further, the processing content is information indicating a processing content corresponding to a corresponding document installation position in a corresponding processing type.

In the example shown in FIG. 4, as described above, in a case where the installation position of the document is on the left end side in the document disposition area 32, the image printing processing in color is registered to be performed. Further, in the example shown in FIG. 4, in a case where the installation position of the document is on the right end side in the document disposition area 32, the image printing processing in monochrome is registered to be performed.

Figure 5:
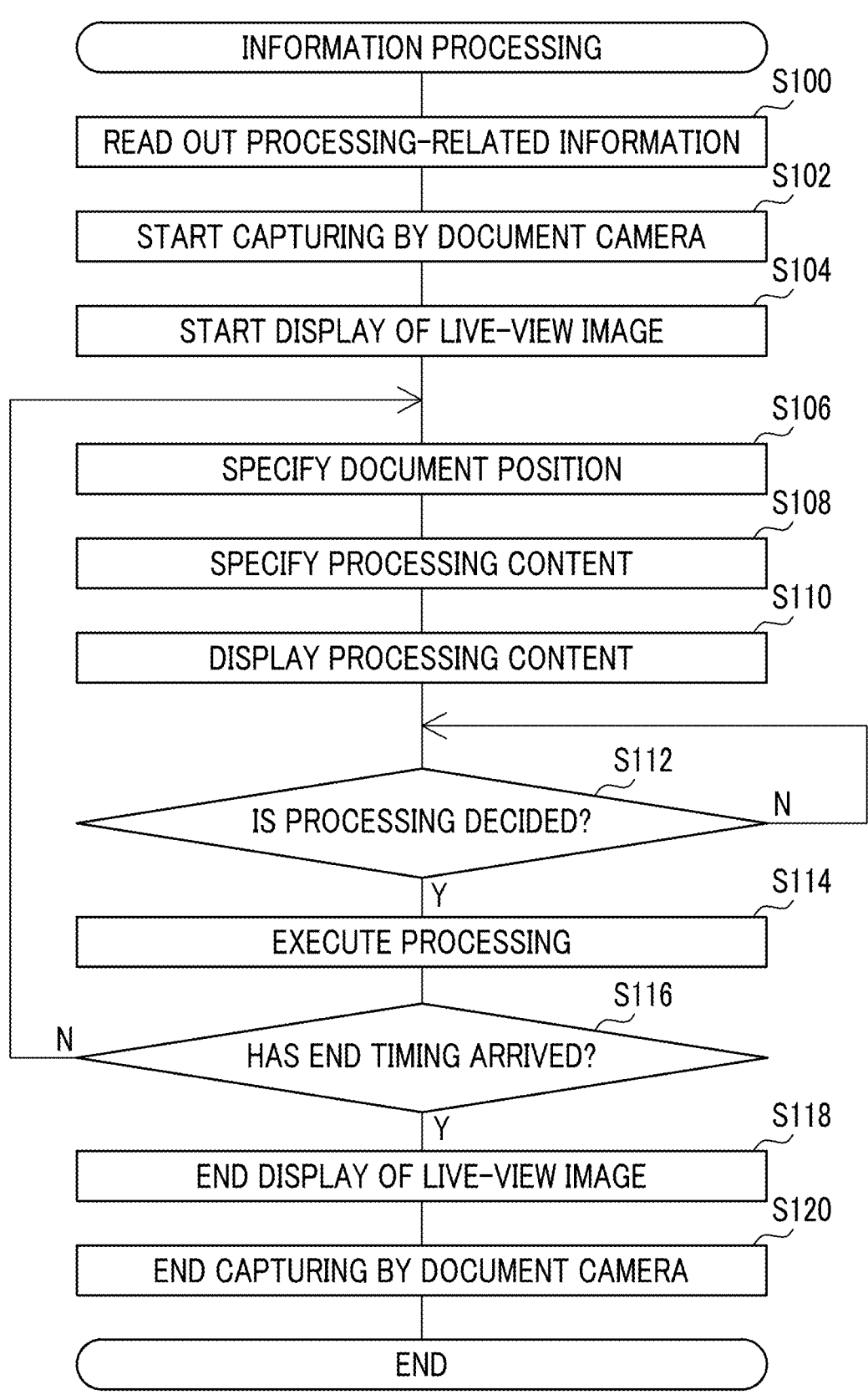
FIG. 5 is a flowchart showing an example of information processing according to the exemplary embodiment.

Next, an action of the image forming apparatus 10 according to the present exemplary embodiment in a case where information processing is executed will be described with reference to FIGS. 5 to 7. FIG. 5 is a flowchart showing an example of the information processing according to the present exemplary embodiment.

In a case where the user issues an instruction to execute the information processing via the UI unit 40, the CPU 11 of the image forming apparatus 10 executes the information processing program 13A to execute the information processing shown in FIG. 5. However, a method of starting the execution of the information processing is not limited to the method.

In Step S100 of FIG. 5, the CPU 11 reads out all the information (hereinafter, referred to as "processing-related information") from the processing-related information database 13B. In Step S102, the CPU 11 transmits an instruction to start the capturing of the moving image to the document camera 70. In response to the instruction, the document camera 70 starts capturing the moving image and starts storing image information indicating the captured image in a predetermined storage area in the storage unit 13.

In Step S104, the CPU 11 controls to read the image information from the storage unit 13 and to repeat display of an image indicated by the image information by the display unit 15 to start display of a live-view image. In this case, the CPU 11 displays an image (hereinafter, referred to as a "guide image") indicating the processing content for each installation position of the document in the document disposition area 32 on the live-view image in a superimposed manner, as described above, using the readout processing-related information.

Figure 6:
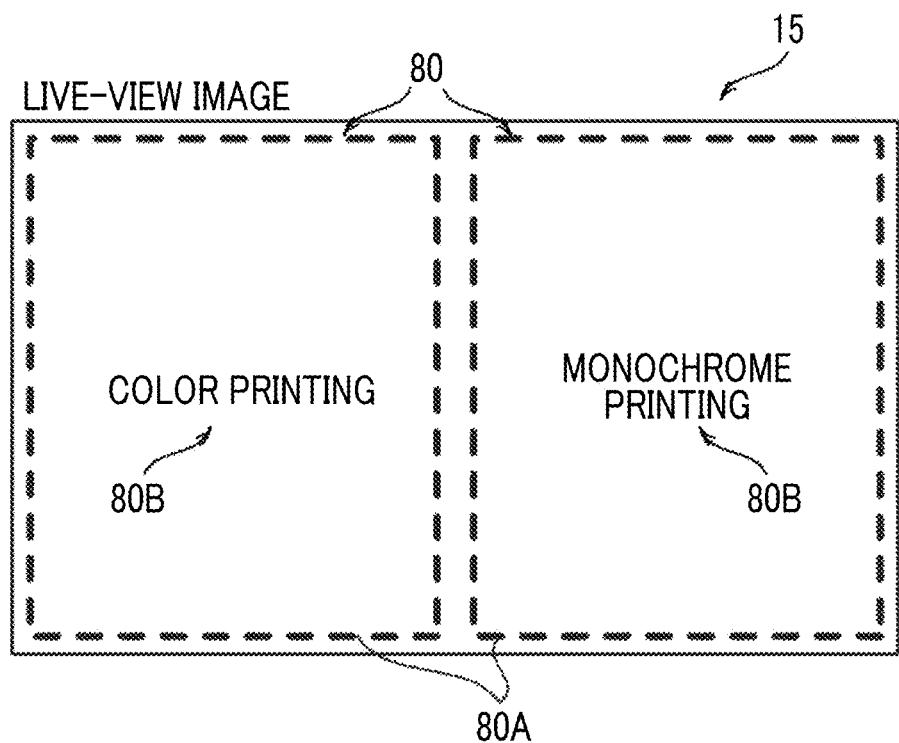
FIG. 6 is a front view of an example of a live-view image (initial state) according to the exemplary embodiment.

FIG. 6 shows an example of the live-view image (initial state) according to the present exemplary embodiment in the point in time.

As shown in FIG. 6, in the live-view image at the point in time, the document is not installed in the document disposition area 32. Thus, nothing is displayed as the subject, but a guide image 80 described above is displayed. As shown in FIG. 6, in the guide image 80 according to the present exemplary embodiment, in a case where a frame 80A indicating an installation range of the document is displayed and the document is installed in the corresponding frame 80A, processing content information 80B indicating the processing content to be executed on the document is displayed inside the frame 80A.

The user installs the document to be processed (hereinafter, referred to as "target document") at a position corresponding to the inside of the frame 80A corresponding to requested processing in the document disposition area 32 of the document table 30, while referring to the displayed guide image 80. In the present exemplary embodiment, a predetermined reference position in the target document (position of upper left corner point in front view in the present exemplary embodiment) is applied as the installation position of the target document, and the frame 80A in which the reference position is located is specified as the frame 80A indicating the processing content. However, the present disclosure is not limited thereto. For example, a form may be employed in which any corner point of a lower left corner point, an upper right corner point, and a lower right corner point of each target document, or any side of a left side, an upper side, a right side, and a lower side of each target document is applied as the reference position. Further, a form may be employed in which a center point of the target document is applied.

In Step S106, the CPU 11 specifies the installation position of the target document as described above. In Step S108, the CPU 11 refers to the readout processing-related information to specify the processing content corresponding to the specified document installation position. In Step S110, the CPU 11 controls the display unit 15 to display a processing content image indicating the specified processing content on the live-view image in a superimposed manner.

Figure 7:
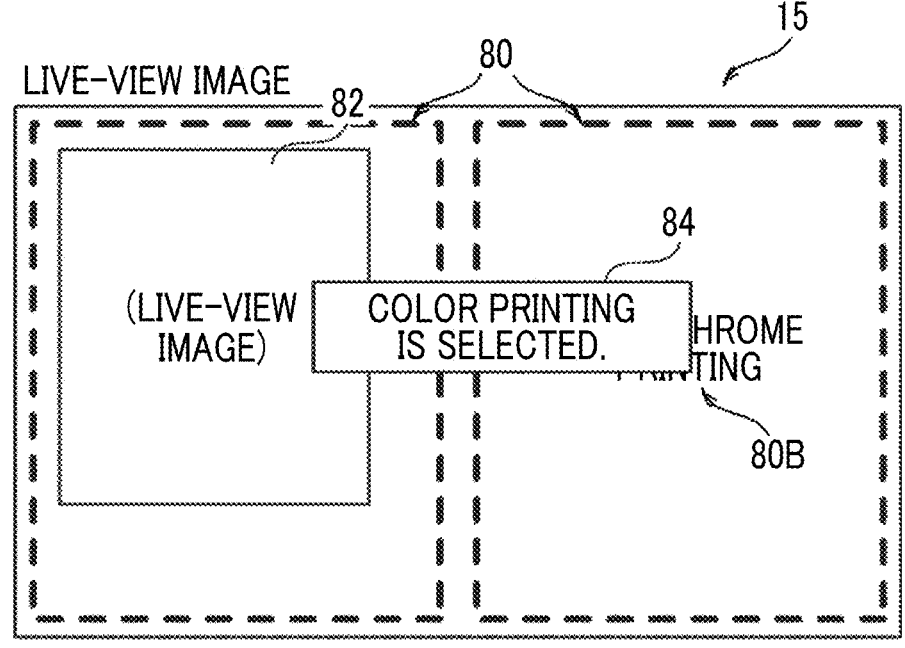
FIG. 7 is a front view of an example of the live-view image (document installation state) according to the exemplary embodiment.

FIG. 7 shows an example of the live-view image (document installation state) according to the present exemplary embodiment in the point in time.

As shown in FIG. 7, in the live-view image at the point in time, the target document 82 is displayed in real time and a processing content image 84 is displayed. Therefore, the user can easily grasp the processing content for the document being installed by the user by referring to the live-view image. The user fixes (stands still) the installation position of the target document 82 at a point in time at which the processing content indicated by the displayed processing content image 84 becomes a requested processing content.

In Step S112, the CPU 11 waits for a predetermined period (5 seconds in the present exemplary embodiment) until the target document 82 stands still to wait until processing for the target document 82 is decided. In Step S114, the CPU 11 executes the decided processing.

As described above, in the present exemplary embodiment, the processing content is decided by the fact that the target document 82 stands still. However, the present disclosure is not limited thereto. For example, a form may be employed in which in a case where the user designates a display area of the processing content image 84, processing indicated by the processing content image 84 is specified as processing to be executed.

In Step S116, the CPU 11 determines whether or not a predetermined end timing has arrived as a timing for ending the present information processing. The processing returns to Step S106 in a case where negative determination is made, while the processing proceeds to Step S118 in a case where positive determination is made. In the present exemplary embodiment, as the end timing, a timing at which the user issues an instruction to end the information processing via the UI unit 40 is applied. However, needless to say, the present disclosure is not limited thereto.

In Step S118, the CPU 11 performs control of stopping the display of the live-view image started by the processing in Step S104. In Step S120, the CPU 11 transmits an instruction to stop the capturing of the moving image to the document camera 70. Thereafter, the present information processing ends. In response to the instruction, the document camera 70 stops the capturing of the moving image.

In the above exemplary embodiment, a case has been described in which only two places on the right and left sides of the document disposition area 32 are applied as the document installation positions for the processing content instruction. However, the present disclosure is not limited thereto. For example, a form may be employed in which an installation position including the above two places or an installation position different from the above two places is applied.

Figure 8:
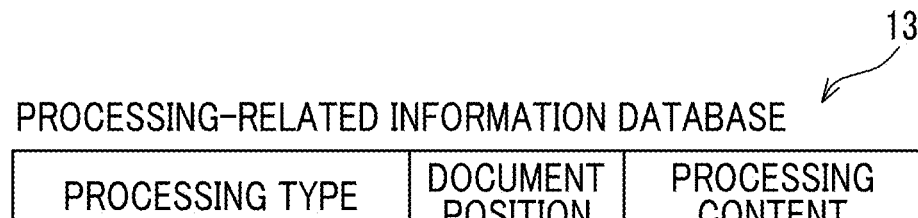
FIG. 8 is a schematic diagram showing an example of a configuration of a processing-related information database according to another exemplary embodiment.

FIG. 8 shows an example of a configuration of the processing-related information database 13B in a case where end portions of the document disposition area 32 in four directions of up, down, right, and left are applied as the document installation positions for the processing content instruction.

As shown in FIG. 8, in this example, the right and left ends of the document disposition area 32 are applied for designation of the image printing processing, and the upper and lower ends of the document disposition area 32 are applied for designation of the image reading processing.

Figure 9:
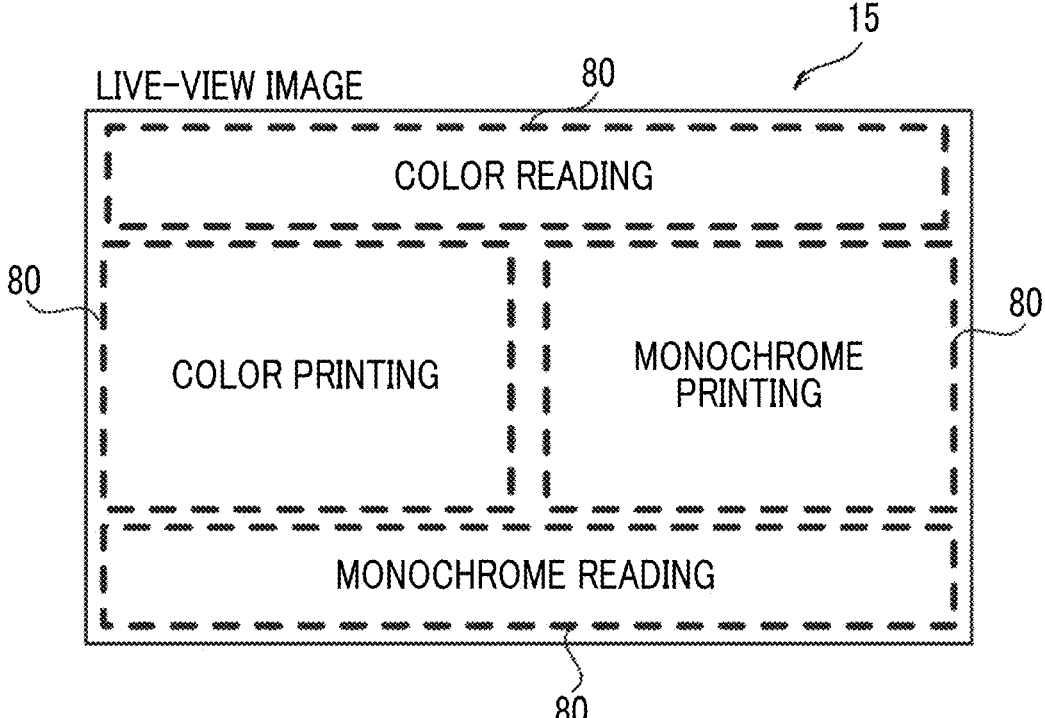
FIG. 9 is a front view of an example of a live-view image (initial state) according to another exemplary embodiment.

FIG. 9 shows an example of the live-view image in the initial state in a case where the processing-related information database 13B is the database shown in FIG. 8. As shown in FIG. 9, the guide image 80 indicating that a band on an upper end side of the document disposition area 32 is applied as for the instruction for the image reading processing in color and a band on a lower end side of the document disposition area 32 is applied as for the instruction for the image reading processing in monochrome is displayed in this example. Further, the guide image 80 indicating that an area on the left end side of the document disposition area 32 and excluding the upper and lower ends is applied as for the instruction for the image printing processing in color and an area on the right end side of the document disposition area 32 and excluding the upper and lower ends is applied as for the instruction for the image printing processing in monochrome is displayed in this example.

Figure 10:
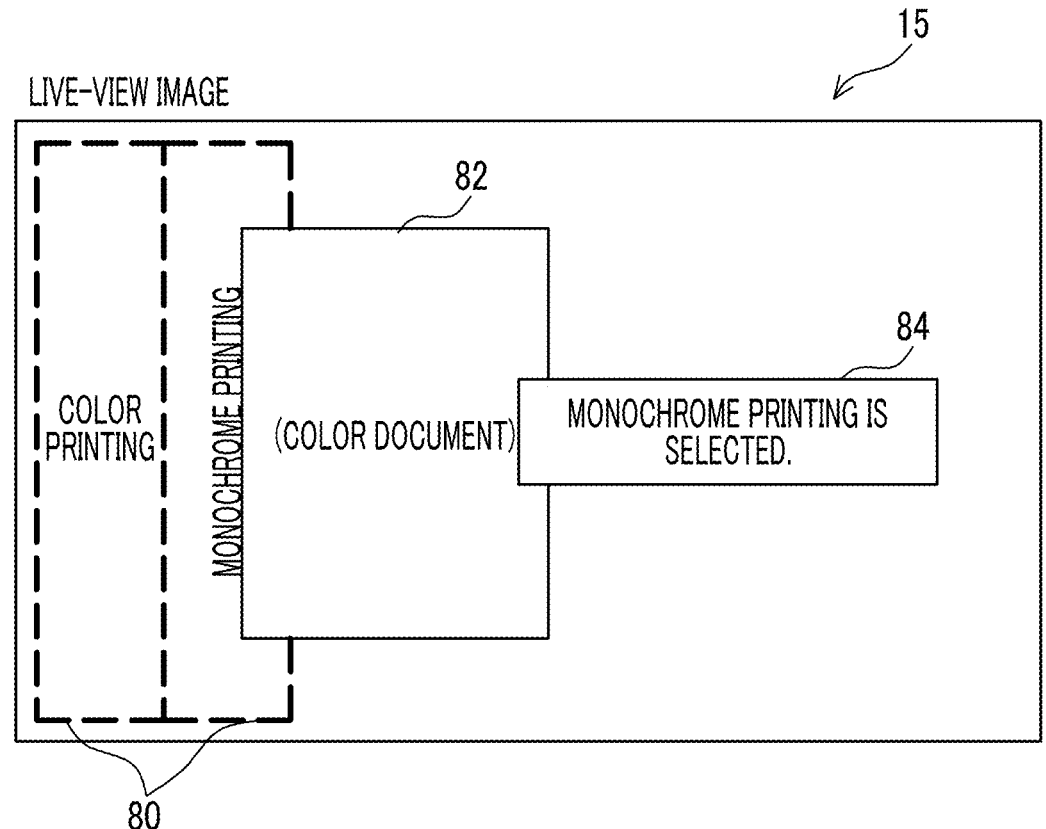
FIG. 10 is a front view of an example of the live-view image (document installation state) according to another exemplary embodiment.

On the other hand, FIG. 10 shows an example of the live-view image in the document installation state in a case where a plurality of divided areas on a predetermined end portion side (left end side in the example shown in FIG. 10) in the document disposition area 32 are applied as the document installation positions. As shown in FIG. 10, the guide image 80 indicating that an area of a leftmost end portion on the left end side of the document disposition area 32 is applied as for the instruction for the image printing processing in color and an area of a second left end portion next closest to the left end portion thereof after the area of the leftmost end portion on the left end side of the document disposition area 32 is applied as for the instruction for the image printing processing in monochrome is displayed in this example. Therefore, in this case, as shown in FIG. 10, in a case where the reference position of the target document 82 is located in the area of the second left end portion, the processing content image 84 indicates the printing processing in monochrome.

Figure 11:
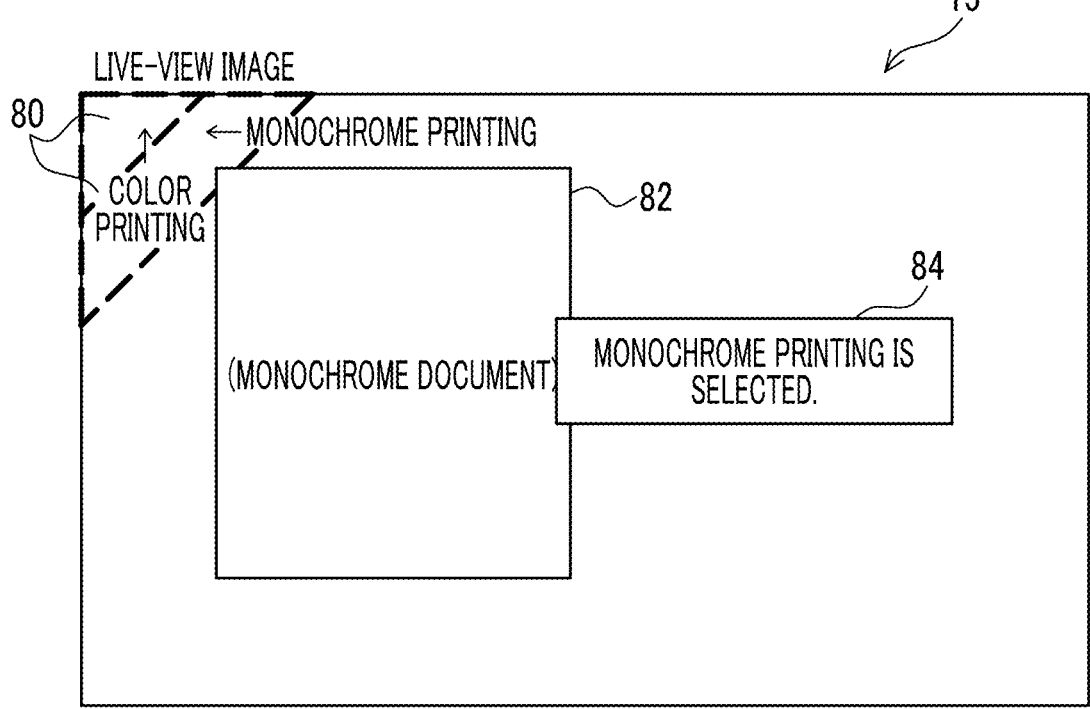
FIG. 11 is a front view of an example of the live-view image (document installation state) according to another exemplary embodiment.

Further, FIG. 11 shows an example of the live-view image in the document installation state in a case where a plurality of divided areas on a predetermined corner point side (upper left corner point side in the example shown in FIG. 11) in the document disposition area 32 are applied as the document installation positions. As shown in FIG. 11, the guide image 80 indicating that an area of a most corner point portion on the upper left corner point side of the document disposition area 32 is applied as for the instruction for the image printing processing in color and an area of a second upper left corner point portion next closest to the upper left corner point portion thereof after the area of the most corner point portion on the upper left corner point side of the document disposition area 32 is applied as for the instruction for the image printing processing in monochrome is displayed in this example. Therefore, in this case, as shown in FIG. 11, in a case where the reference position of the target document 82 is located in the area of the second upper left corner point portion, the processing content image 84 indicates the printing processing in monochrome.

Figure 12:
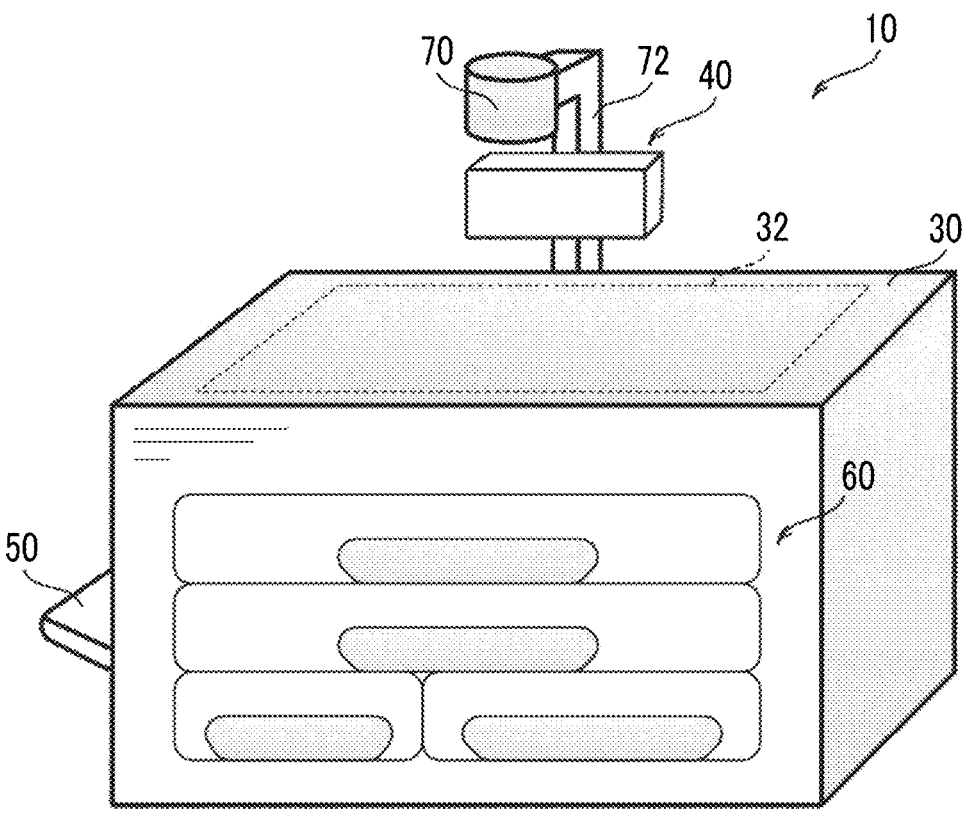
FIG. 12 is a perspective view of an example of an overall configuration of an image forming apparatus according to another exemplary embodiment.

In the above exemplary embodiment, a case has been described in which the technique of the present disclosure is applied to the image forming apparatus 10 in which the UI unit 40 is provided on a front surface side of the apparatus, shown in FIG. 1 as an example. However, the present disclosure is not limited thereto. For example, a form may be employed in which the technique of the present disclosure is applied to the image forming apparatus 10 in which the UI unit 40 is provided on a rear surface side (the arm 72 of the document camera 70 in the example shown in FIG. 10) of the apparatus, shown in FIG. 12 as an example.

Although the exemplary embodiment has been described above, the technical scope of the present invention is not limited to the scope described in the above exemplary embodiment. Various changes or improvements can be made to the exemplary embodiment without departing from the gist of the invention, and the modified or improved form is also included in the technical scope of the present invention.

The above exemplary embodiment does not limit the invention according to the claim, and not all combinations of features described in the exemplary embodiment are requested for a solution of the invention. The above exemplary embodiments include inventions at various stages, and various inventions are extracted by combining a plurality of disclosed constituent elements. Even though some constituent elements are deleted from all the constituent elements shown in the exemplary embodiment, as long as an effect is obtained, a configuration in which some constituent elements are deleted can be extracted as an invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above exemplary embodiment, a case has been described in which the information processing is realized by executing a program with a software configuration using a computer. However, the present invention is not limited thereto. For example, the information processing may be realized by a hardware configuration or a combination of a hardware configuration and a software configuration.

In addition, the configuration of the image forming apparatus 10 described in the above exemplary embodiment is an example, and, needless to say, an unnecessary portion may be deleted or a new portion may be added within a range that does not deviate from the gist of the present invention.

The flow of information processing described in the above exemplary embodiment is also an example, and, needless to say, an unnecessary step may be deleted, a new step may be added, or the processing order may be changed within a range that does not deviate from the gist of the present invention.

Supplementary Note (((1)))
An information processing apparatus comprising:
a processor configured to:
execute processing using an image of a document, on the document, the processing corresponding to an installation position of the document in an installation area where the document is installed.

(((2)))
The information processing apparatus according to (((1))), wherein the processor is configured to:
present a content of the processing for each installation position of the document in the installation area.
(((3)))
The information processing apparatus according to (((2))), wherein the processor is configured to:
perform the presentation before the document is installed in the installation area.
(((4)))
The information processing apparatus according to any one of (((1))) to (((3))), wherein the processor is configured to:
in a case where the document is installed in the installation area, present a content of processing corresponding to the installation position.
(((5)))
The information processing apparatus according to (((4))), wherein the processor is configured to:
present the content of the processing together with an image of the document.
(((6)))
The information processing apparatus according to any one of (((1))) to (((5))),
wherein the installation position of the document includes a plurality of divided areas on a predetermined end portion side in the installation area.
(((7)))
The information processing apparatus according to (((6))),
wherein a predetermined end portion is an end portion on a left side in front view.
(((8)))
The information processing apparatus according to (((7))),
wherein the predetermined end portion is an upper left corner point in front view.
(((9)))
The information processing apparatus according to any one of (((1))) to (((8))), wherein the processor is configured to:
use an image obtained by imaging the installation area with a document camera to specify the installation position of the document.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An information processing apparatus comprising:
a processor configured to:
execute a first processing using a first setting on a document in a case where the document is disposed at a first position in an installation area; and execute a second processing using a second setting different from the first setting on the document in a case where the document is disposed at a second position in the installation area.

2. The information processing apparatus according to claim 1, wherein the processor is configured to:

present a content of the processing for each installation position of the document in the installation area.

3. The information processing apparatus according to claim 2, wherein the processor is configured to:

perform the presentation before the document is disposed in the installation area.

4. The information processing apparatus according to claim 1, wherein the processor is configured to:

in a case where the document is disposed in the installation area, present a content of processing corresponding to the installation position.

5. The information processing apparatus according to claim 4, wherein the processor is configured to:

present the content of the processing together with an image of the document.

6. The information processing apparatus according to claim 1, wherein the installation position of the document includes a plurality of divided areas on a predetermined end portion side in the installation area.

7. The information processing apparatus according to claim 6, wherein a predetermined end portion is an end portion on a left side in front view.

8. The information processing apparatus according to claim 7, wherein the predetermined end portion is an upper left corner point in front view.

9. The information processing apparatus according to claim 1, wherein the processor is configured to:

use an image obtained by imaging the installation area with a document camera to specify the installation position of the document.

10. The information processing apparatus according to claim 2, wherein the processor is configured to:

use an image obtained by imaging the installation area with a document camera to specify the installation position of the document.

11. The information processing apparatus according to claim 3, wherein the processor is configured to:

use an image obtained by imaging the installation area with a document camera to specify the installation position of the document.

12. The information processing apparatus according to claim 4, wherein the processor is configured to:

use an image obtained by imaging the installation area with a document camera to specify the installation position of the document.

13. The information processing apparatus according to claim 5, wherein the processor is configured to:

use an image obtained by imaging the installation area with a document camera to specify the installation position of the document.

14. The information processing apparatus according to claim 6, wherein the processor is configured to:

use an image obtained by imaging the installation area with a document camera to specify the installation position of the document.

15. The information processing apparatus according to claim 7, wherein the processor is configured to:

use an image obtained by imaging the installation area with a document camera to specify the installation position of the document.

16. The information processing apparatus according to claim 8, wherein the processor is configured to:

use an image obtained by imaging the installation area with a document camera to specify the installation position of the document.

17. A non-transitory computer readable medium storing an information processing program causing a computer to execute a process comprising:

executing a first processing using a first setting on a document in a case where the document is disposed at a first position in an installation area; and executing a second processing using a second setting different from the first setting on the document in a case where the document is disposed at a second position in the installation area.

18. An information processing method comprising:

executing a first processing using a first setting on a document in a case where the document is disposed at a first position in an installation area; and executing a second processing using a second setting different from the first setting on the document in a case where the document is disposed at a second position in the installation area.

* * * * *